United States Patent
Mandal et al.

(10) Patent No.: US 9,571,400 B1
(45) Date of Patent: *Feb. 14, 2017

(54) WEIGHTED LOAD BALANCING IN A MULTISTAGE NETWORK USING HIERARCHICAL ECMP

(71) Applicant: GOOGLE INC., Mountain View, CA (US)

(72) Inventors: Subhasree Mandal, San Jose, CA (US); Abdul Kabbani, Los Gatos, CA (US)

(73) Assignee: Google Inc., Mountain View, CA (US)

( * ) Notice: Subject to any disclaimer, the term of this patent is extended or adjusted under 35 U.S.C. 154(b) by 135 days.

This patent is subject to a terminal disclaimer.

(21) Appl. No.: 14/217,937

(22) Filed: Mar. 18, 2014

Related U.S. Application Data (60) Provisional application No. 61/944,564, filed on Feb. 25, 2014.

(51) Int. Cl.
*H04L 12/50* (2006.01)
*H04L 12/803* (2013.01)

(52) U.S. Cl.
CPC ................................. *H04L 47/125* (2013.01)

(58) Field of Classification Search
CPC .................................................... H04L 47/125
USPC .................................................. 370/235, 392
See application file for complete search history.

(56) References Cited

U.S. PATENT DOCUMENTS

| | | | | |
|---|---|---|---|---|
| 7,190,696 B1* | 3/2007 | Manur | ..................... | H04L 45/00 370/392 |
| 7,568,047 B1* | 7/2009 | Aysan | ..................... | H04L 45/02 370/352 |
| 7,898,959 B1* | 3/2011 | Arad | ..................... | H04L 45/00 370/235 |
| 7,903,654 B2* | 3/2011 | Bansal | ..................... | H04L 45/00 370/392 |
| 8,595,239 B1* | 11/2013 | Yadav | ..................... | G06F 17/30949 707/747 |
| 8,612,269 B2* | 12/2013 | Baggett | ..................... | G06F 17/30457 705/5 |
| 8,769,148 B1* | 7/2014 | Singh | ..................... | H04L 45/7453 709/242 |
| 8,787,400 B1* | 7/2014 | Barth | ..................... | H04L 45/24 370/419 |

(Continued)

OTHER PUBLICATIONS

Liu, et al, "zUpdate: Updating Data Center Networks with Zero Loss", SIGCOMM'13, Aug. 12-16, 2013, 12 pages.

(Continued)

*Primary Examiner* — Parth Patel
(74) *Attorney, Agent, or Firm* — McDermott Will & Emery LLP (57) ABSTRACT

A method for weighted routing of data traffic can include generating a first hash value based on a header of a data packet and performing a lookup in a first equal cost multipath (ECMP) table using the first hash value to select a secondary ECMP table. The first ECMP table can include a weighted listing of at least two secondary ECMP tables. The method can further include generating a second hash value based on the header of the data packet and performing a lookup in the selected secondary ECMP table based on the second hash value to select an egress port of a plurality of egress ports of the data switch. The method can further include forwarding the data packet on the selected egress port.

26 Claims, 5 Drawing Sheets

(56) References Cited

U.S. PATENT DOCUMENTS

| | | | | | |
|---|---|---|---|---|---|
| 8,837,470 B1* | 9/2014 | Zhou | .................. | H04Q 11/08 | 370/357 |
| 8,861,527 B1* | 10/2014 | Bao | .................. | H04L 12/1836 | 370/392 |
| 8,873,567 B1* | 10/2014 | Mandal | .................. | H04L 12/26 | 370/400 |
| 8,902,751 B1* | 12/2014 | Zhou | .................. | H04L 12/6418 | 370/235 |
| 8,953,605 B1* | 2/2015 | Mehra | .................. | H04L 12/28 | 370/392 |
| 9,083,710 B1* | 7/2015 | Yadav | .................. | H04L 67/1004 | |
| 9,246,821 B1* | 1/2016 | Li | .................. | H04L 47/125 | |
| 2003/0223413 A1* | 12/2003 | Guerrero | .................. | H04L 45/245 | 370/389 |
| 2004/0264380 A1* | 12/2004 | Kalkunte | .................. | H04L 45/00 | 370/238 |
| 2005/0270972 A1* | 12/2005 | Kodialam | .................. | H04L 45/04 | 370/216 |
| 2008/0071404 A1* | 3/2008 | Park | .................. | G06Q 10/06 | 700/100 |
| 2008/0181103 A1* | 7/2008 | Davies | .................. | H04L 47/125 | 370/230 |
| 2010/0265824 A1* | 10/2010 | Chao | .................. | H04L 12/66 | 370/235 |
| 2010/0290458 A1* | 11/2010 | Assarpour | .................. | H04L 45/00 | 370/389 |
| 2011/0134925 A1* | 6/2011 | Safrai | .................. | H04L 49/35 | 370/395.53 |
| 2011/0286462 A1* | 11/2011 | Kompella | .................. | H04L 45/18 | 370/395.53 |
| 2012/0134497 A1* | 5/2012 | Roitshtein | .................. | H04L 47/125 | 380/259 |
| 2012/0136846 A1* | 5/2012 | Song | .................. | H04L 45/7453 | 707/698 |
| 2012/0170575 A1* | 7/2012 | Mehra | .................. | H04L 41/00 | 370/359 |
| 2012/0179800 A1* | 7/2012 | Allan | .................. | H04L 45/245 | 709/223 |
| 2012/0230225 A1* | 9/2012 | Matthews | .................. | H04L 47/125 | 370/255 |
| 2012/0314581 A1* | 12/2012 | Rajamanickam | ... | H04L 41/0826 | 370/238 |
| 2013/0286846 A1* | 10/2013 | Atlas | .................. | H04L 45/34 | 370/236 |
| 2013/0329730 A1* | 12/2013 | Zhang | .................. | H04L 12/4641 | 370/392 |
| 2014/0064091 A1* | 3/2014 | Basso | .................. | H04L 45/7453 | 370/235.1 |
| 2014/0101336 A1* | 4/2014 | Yang | .................. | H04L 45/02 | 709/244 |
| 2014/0355615 A1* | 12/2014 | Chang | .................. | H04L 45/64 | 370/392 |
| 2015/0033016 A1* | 1/2015 | Thornton | .................. | H04L 9/0825 | 713/171 |
| 2015/0058595 A1* | 2/2015 | Gura | .................. | G06F 12/1018 | 711/206 |
| 2015/0063360 A1* | 3/2015 | Thakkar | .................. | H04L 45/745 | 370/400 |
| 2015/0138957 A1* | 5/2015 | Kaushik | .................. | H04L 45/28 | 370/228 |
| 2015/0163133 A1* | 6/2015 | Grosser | .................. | H04L 45/50 | 370/400 |
| 2015/0163146 A1* | 6/2015 | Zhang | .................. | H04L 47/125 | 370/238 |

OTHER PUBLICATIONS

Al-Fares, Mohammad, et al. A Scalable, Commodity Data Center Network Architecture, ACM SIGCOMM Computer Communication Review, vol. 38 No. 4, pp. 63-74, ACM, 2008.

US Notice of Allowance issued Jul. 28, 2016 in U.S. Appl. No. 14/539,796.

Zhou, Junlan, et al. WCMP: Weighted Cost Multipathing for Improved Fairness in Data Centers, Proceedings of the Ninth European Conference on Computer Systems. ACM, Apr. 13-16, 2014.

* cited by examiner

| INDEX | PORT SET |
|---|---|
| 0 | 0 |
| 1 | 1 |
| 2 | 1 |
| 3 | 1 |
| 4 | 1 |
| 5 | 1 |
| 6 | 1 |
| 7 | 1 |

FIG. 8B

| INDEX | PORT |
|---|---|
| 0 | 0 |
| 1 | 1 |
| 2 | 2 |
| 3 | 3 |
| 4 | 4 |
| 5 | 5 |

FIG. 8C

| INDEX | PORT |
|---|---|
| 0 | 0 |
| 1 | 1 |
| 2 | 2 |
| 3 | 3 |
| 4 | 4 |
| 5 | 5 |
| 6 | 6 |
| 7 | 7 |

WEIGHTED LOAD BALANCING IN A MULTISTAGE NETWORK USING HIERARCHICAL ECMP

CROSS-REFERENCE TO RELATED APPLICATION

This application is a Nonprovisional of, and claims priority to, U.S. Patent Application No. 61/944,564, filed on Feb. 25, 2014, entitled "WEIGHTED LOAD BALANCING IN A MULTISTAGE NETWORK USING HEIRACHICAL ECMP", which is incorporated by reference herein in its entirety.

TECHNICAL FIELD

This description relates to systems and techniques for weighted load balancing in a multistage network.

BACKGROUND

A network may include a multistage network, which may include a wired and/or wireless network. In some example implementations, a multistage network may be used in the context of telecommunication and data centers to realize large-scale networks. A multistage network in a data center may have a large shared infrastructure of shared resources. In the multistage network, there may be multiple paths on which to send traffic between a source device and a destination device using the shared infrastructure. Weighted routing of data traffic over such multiple paths can be used to load balance data traffic in a multistage networks. However, current approaches for weighted may be complicated to implement in large multistage networks, such as, for example, data center networks.

SUMMARY

According to one general aspect, a method includes generating, by a data switch, a first hash value based on a header of a data packet and performing a lookup in a first equal cost multi-path (ECMP) table using the first hash value. The first ECMP table includes a weighted listing of at least two secondary ECMP tables The lookup in the first ECMP table selects a secondary ECMP table of the at least two secondary ECMP tables. The method further includes generating, by the data switch, a second hash value based on the header of the data packet and performing a lookup in the selected secondary ECMP table based on the second hash value to select an egress port of a plurality of egress ports of the data switch. A first secondary ECMP table of the at least two secondary ECMP tables includes a listing of a first set of egress ports of the plurality of egress port and a second secondary ECMP table of the at least two secondary ECMP tables includes a listing of a second set of egress ports of the plurality of egress ports. The listing of the first set of egress ports is different than the listing of the first set of egress ports. The method also includes forwarding the data packet on the selected egress port.

Implementations of the above general aspect may include one or more of the following features. For example, generating the first hash value can include generating the first hash value using a first hash function and generating the second hash value using a second hash function. The second hash function can be the same or can be different than the first hash function. The first hash value and the second hash value can be a same hash value.

The first set of egress ports and the second set of egress ports can be a same set of egress ports of the plurality of egress ports. The listing of the first set of egress ports in the first secondary ECMP table can be a weighted listing and the listing of the second set of egress ports in the second secondary ECMP table can be an un-weighted listing.

The first set of egress ports and the second set of egress ports can be different sets of egress ports, the first set of egress ports being a subset of the plurality of egress ports. The listing of the first set of egress ports in the first secondary ECMP table can be a first un-weighted listing and the listing of the second set of egress ports in the second secondary ECMP table can be a second un-weighted listing.

Weights in the first ECMP table can be based on a ratio of at least one routing weight of the first set of egress ports and at least one routing weight of the second set of egress ports.

A third secondary ECMP table of the at least two secondary ECMP tables can include a listing of a third set of egress ports of the plurality of egress ports, the listing of the third set of egress ports being different than the listing of the first set of egress ports and the listing of the second set of egress ports. The first set of egress ports, the second set of egress ports and the third set egress ports can different sets of the plurality of egress ports, the first set of egress ports can be a first subset of the plurality of egress ports and the second set of egress ports can be a second subset of the plurality of egress ports. The listing of the first set of egress ports in the first secondary ECMP table can be a first un-weighted listing, the listing of the second set of egress ports in the second secondary ECMP table can be a second un-weighted listing and the listing of the third set of egress ports in the third secondary ECMP table can be a third un-weighted listing.

The first set of egress ports and the second set of egress ports can be different sets of egress ports, the second set of egress ports and the third set of egress ports can be a same set of egress ports. The first set of egress ports can be a subset of the plurality of egress ports. The listing of the first set of egress ports in the first secondary ECMP table can be a first un-weighted listing, the listing of the second set of egress ports in the second secondary ECMP table is can be a weighted listing and the listing of the third set of egress ports in the third secondary ECMP table can be a second un-weighted listing.

In another general aspect, a data switch includes at least one memory that is configured to store instructions and at least one processor that is operably coupled to the at least one memory. The at least one processor may be configured to process the instructions to cause the data switch to generate a first hash value based on a header of a data packet and perform a lookup in a first equal cost multi-path (ECMP) table using the first hash value. The first ECMP table includes a weighted listing of at least two secondary ECMP tables. The lookup in the first ECMP table selects a secondary ECMP table of the at least two secondary ECMP tables. The instructions further cause the data switch to generate a second hash value based on the header of the data packet and perform a lookup in the selected secondary ECMP table based on the second hash value to select an egress port of a plurality of egress ports of the data switch. A first secondary ECMP table of the at least two secondary ECMP tables includes a listing of a first set of egress ports of the plurality of egress ports. A second secondary ECMP table of the at least two secondary ECMP tables includes a listing of a second set of egress ports of the plurality of egress ports. The listing of the first set of egress ports is different than the listing of the first set of egress ports. The instructions further cause the data switch to forward the data packet on the selected egress port.

Implementations of the above general aspect may include one or more of the following features. For example, the first set of egress ports and the second set of egress ports can be a same set of egress ports. The listing of the first set of egress ports in the first secondary ECMP table can be a weighted listing and the listing of the second set of egress ports in the second secondary ECMP table can be an un-weighted listing.

The first set of egress ports and the second set of egress ports can be different sets of egress ports. The first set of egress ports can be a subset of the plurality of egress ports, the listing of the first set of egress ports in the first secondary ECMP table can be a first un-weighted listing and the listing of the second set of egress ports in the second secondary ECMP table can be a second un-weighted listing.

A third secondary ECMP table of the at least two secondary ECMP tables can include a listing of a third set of egress ports of the plurality of egress ports. The listing of the third set of egress ports can be different than the listing of the first set of egress ports and the listing of the second set of egress ports. The first set of egress ports, the second set of egress ports and the third set egress ports can be different sets of egress ports, the first set of egress ports being a first subset of the plurality of egress ports and the second set of egress ports being a second subset of the plurality of egress ports. The listing of the first set of egress ports in the first secondary ECMP table can be a first un-weighted listing, the listing of the second set of egress ports in the second secondary ECMP table can be a second un-weighted listing and the listing of the third set of egress ports in the third secondary ECMP table can be a third un-weighted listing.

The first set of egress ports and the second set of egress ports can be different sets of egress ports. The second set of egress ports and the third set of egress ports can be a same set of egress ports, the first set of egress ports can be a subset of the plurality of egress ports. The listing of the first set of egress ports in the first secondary ECMP table can be a first un-weighted listing, the listing of the second set of egress ports in the second secondary ECMP table can be a weighted listing and the listing of the third set of egress ports in the third secondary ECMP table can be a second un-weighted listing.

In another general aspect, a method includes receiving, at a data switch, a set of routing weights for a plurality of egress ports of the data switch and converting the set of routing weights to a two-level hierarchy of equal cost multi-path (ECMP) tables. The converting includes generating a first-level ECMP table, generating a first second-level ECMP table and generating a second second-level ECMP table. The first-level ECMP table including a weighted listing of the first second-level ECMP table and the second second-level ECMP table. The first second-level ECMP table includes a listing of a first set of egress ports of the plurality of egress ports. The second second-level ECMP table includes a listing of a second set of egress ports of the plurality of egress ports. The listing of the second set of egress ports is different than the listing of the first set of egress ports. The method further includes storing the two-level hierarchy of ECMP tables in the data switch.

Implementations of the above general aspect may include one or more of the following features. For example, the first set of egress ports and the second set of egress ports can be a same set of egress ports of the plurality of egress ports. The listing of the first set of egress ports in the first second-level ECMP table can be a weighted listing. The listing of the second set of egress ports in the second second-level ECMP table can be an un-weighted listing.

Weights in the first second-level ECMP table can be based on, at least, a ratio of a first routing weight of the received routing weights and a second routing weight of the received routing weights. The first routing weight can be associated with at least a first egress port of the plurality of egress ports. The second routing weight can be associated with at least a second egress port of the plurality of egress ports, where the second egress port is different than the first egress port.

The first set of egress ports and the second set of egress ports can be different sets of egress ports. The first set of egress ports can be a subset of the plurality of egress ports. The listing of the first set of egress ports in the first second-level ECMP table can be a first un-weighted listing. /the listing of the second set of egress ports in the second second-level ECMP table can be a second un-weighted listing. Weights in the first-level ECMP table can be based on, at least, a ratio of a first routing weight of the received routing weights and a second routing weight of the received routing weights. The first routing weight can be associated with at least a first egress port of the plurality of egress ports. The second routing weight can associated with at least a second egress port of the plurality of egress ports, where the second egress port is different than the first egress port.

Converting the set of routing weights to the two-level hierarchy of ECMP tables can include generating a third second-level ECMP table that includes a listing of a third set of egress ports of the plurality of egress ports. The listing of the third set of egress ports can be different than the listing of the first set of egress ports and the listing of the second set of egress ports.

In another general aspect, a data switch includes at least one memory that is configured to store instructions and at least one processor that is operably coupled to the at least one memory. The at least one processor may be configured to process the instructions to cause the data switch to receive a set of routing weights for a plurality of egress ports of the data switch and convert the set of routing weights to a two-level hierarchy of equal cost multi-path (ECMP) tables. The converting includes generating a first-level ECMP table, generating a first second-level ECMP table and generating a second second-level ECMP table. The first ECMP table includes a weighted listing of the first second-level ECMP table and the second second-level ECMP table. The first second-level ECMP table includes a listing of a first set of egress ports of the plurality of egress ports. The second second-level ECMP table includes a listing of a second set of egress ports of the plurality of egress ports, the listing of the second set of egress ports being different than the listing of the first set of egress ports. The instructions further cause the data switch to store the two-level hierarchy of ECMP tables in the data switch.

Implementations of the above general aspect may include one or more of the following features. For example, the first set of egress ports and the second set of egress ports can be a same set of egress ports of the plurality of egress ports. The listing of the first set of egress ports in the first second-level ECMP table can be a weighted listing and the listing of the second set of egress ports in the second second-level ECMP table can be an un-weighted listing.

Weights in the first second-level ECMP table can be based on, at least, a ratio of a first routing weight of the received routing weights and a second routing weight of the received routing weights. The first routing weight can be associated with at least a first egress port of the plurality of egress ports.

The second routing weight can be associated with at least a second egress port of the plurality of egress ports, the second egress port being different than the first egress port.

Weights in the first-level ECMP table can be based on, at least, a ratio of a first routing weight of the received routing weights and a second routing weight of the received routing weights. The first routing weight can be associated with at least a first egress port of the plurality of egress port. The second routing weight can be associated with at least a second egress port of the plurality of egress ports, the second egress port being different than the first egress port.

Converting the set of routing weights to the two-level hierarchy of ECMP tables can include generating a third second-level ECMP table that includes a listing of a third set of egress ports of the plurality of egress ports. The listing of the third set of egress ports can be different than the listing of the first set of egress ports and the listing of the second set of egress ports.

The details of one or more implementations are set forth in the accompa-nying drawings and the description below. Other features will be apparent from the description and drawings, and from the claims.

DETAILED DESCRIPTION

This document describes systems and techniques for routing packets in a network. For example, a source device may transmit packets to a destination device using a multi-level network, where multiple data paths (links) may be available (used) to transmit data between the source device and the destination device. Data switches (or other data routing devices) in the multi-level network may use a weighted cost multi-path (WCMP) routing table (e.g., included in a WCMP routing module) to balance data traffic (between the source device and the destination device) over the multiple paths between the source device and the destination device. Such load balancing (e.g., WCMP data traffic routing) may be implemented using the techniques described herein.

Figure 1:
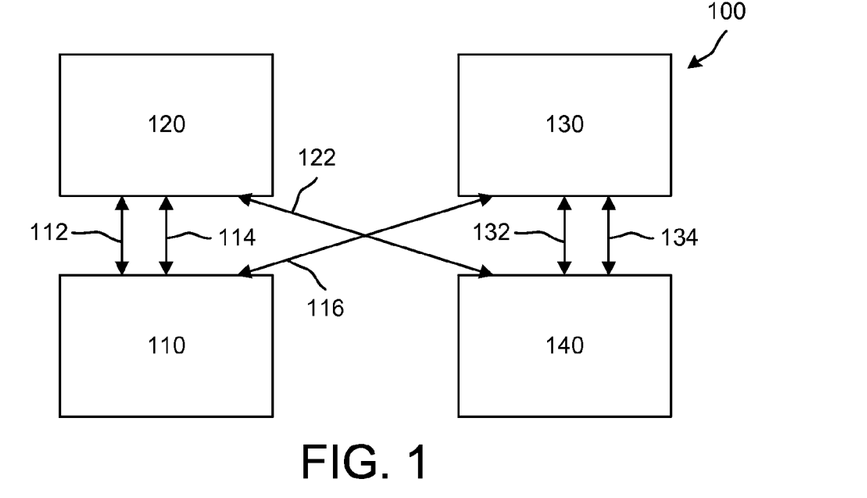
FIG. 1 is a block diagram illustrating a multi-level, multi-path network, in accordance with an implementation.

FIG. 1 is a block diagram illustrating a multi-level, multi-path network 100, in accordance with an implementation. The network 100 includes a first data switch 110, a second data switch 120, a third data switch 130 and a fourth data switch 140. The network 100 also includes data communication links 112,114, 116, 122, 132, 134, which are used to communicate data (e.g., packet data) between the data switches 110, 120, 130, 140. The data switches 110, 120, 130, 140 may include a number of different devices, such as a network data switch, a router, or other device capable of communicating (steering, routing, switching) data (such as packet data) from a source device to a destination device.

The network 100 illustrated in FIG. 1 (which may be referred to as a multistage network) is shown for purposes of illustration. In other implementations, such multistage networks may include a large number of data communication devices (data switching devices). For example, such multi-stage networks may be used to implement large-scale commercial networks, such as commercial data center networks (DCNs). Scalability of such networks may be achieved by using relatively inexpensive and power-efficient commodity data switch devices as the building block at each network stage, instead of using fewer relatively expensive, high-end, large and complex switches.

In such multistage networks, data traffic may be routed using equal cost multi-path (ECMP) routing for load-balancing data traffic across the different switches at each stage. When the data switches in a multistage network, such as the data switches in the network 100, have more than one neighbor on which they can forward data traffic toward a given destination (e.g., with all resulting routes preferably being of a same length), ECMP randomly distributes (e.g., using a hash function and a corresponding modulus operation) to route different data traffic flows destined for the given destination across a group of ports connected to those neighbors, with substantially the same probability of each path being selected for a given data flow. For instance, if two communication links connect a first data switch and a second data switch, using ECMP would result, over a sufficient sample size, in fifty percent of data traffic that is communicated between the first switch and the second switch being communicated over one data communication link and the other fifty percent of data traffic being communicated over the other data communication link. Accordingly, such ECMP approaches may provide substantially equally balanced traffic distribution in multistage networks that are of uniform topology (e.g., there is a same number of data links from a given data switch to each neighboring switch along parallel data paths).

However, ECMP approaches would not (e.g., presuming the use of statistically sufficient random selection) provide such evenly balanced traffic distribution in multistage networks that have uneven inter-stage connectivity topologies. For example, in a network with such an uneven inter-stage connection topology, the ports (ingress ports and egress ports, which may also be referred to as communication links, or links) that connect a sending switch with its neighboring switches on parallel paths are not evenly distributed.

As illustrated in FIG. 1, the network 100 includes such an uneven inter-stage topology (connectivity). For instance, in the network 100, the data switch 110 may communicate data traffic to the data switch 140 via the data switch 120, or via the data switch 130. However, there are two links 112,114 connecting the data switch 110 and the data switch 120, while there is only one link 116 connecting the data switch 110 and the data switch 130.

Such uneven inter-stage connectivity in such a multistage network may occur, for instance, by design. This design choice may occur because of the number of data switches present at each stage (e.g., due to the configuration of the particular network), or may occur because the multistage network was intentionally configured to leverage certain traffic locality patterns with uneven inter-stage connectivity. In other instances, uneven inter-stage connectivity in a multi-stage network may occur as a result of link failures between data switches in the network.

Weighted cost multi-path (WCMP) data routing may be used to overcome, at least some of, the shortcomings of ECMP to evenly balance data traffic in such multi-stage networks with uneven inter-stage topologies. Because ECMP, which inherently assumes that all paths to a certain destination have a same capacity, balancing data traffic across unevenly distributed links with equal probability results in unequal traffic loading.

For example and purposes of illustration, with reference to FIG. 1, consider using ECMP for routing data traffic from the data switch 110 to the data switch 140 (where that traffic can go through either the data switch 120 or the data switch 130). Because ECMP routes data traffic using an equal-probability hashing function (e.g., and a corresponding modulo function), that is equally like to select each of the egress ports (links) 112, 114, 116 of the data switch 110 (which, in this example, are presumed to have equal capacity) for an arbitrary data flow, using ECMP would (over a population of data flows) result in twice as much data traffic being sent to data switch 120 (e.g., over the links 112, 114) as compared to the amount of data traffic sent to the data switch 130, despite the fact that the overall capacities of the two parallel paths from the switch 110 to the switch 140 (i.e., respectively through the switch 120 and the switch 130) are substantially the same (e.g., each of the links 112,114, 116, 122, 132, 134 have the same capacity).

Accordingly, using ECMP in the network 100 (with its uneven inter-stage topology) leads to (for data traffic from the switch 110 to the switch 140) underutilizing the path through data switch 130 by 50% compared to using WCMP, where the links 112, 114 (from the switch 110 to 120) each have a weight of "1" and the link 116 (from the switch 110 to the switch 130) has a weight of "2", resulting in twice as much data traffic (from the switch 110 to the switch 140) being routed on the link 116 as each of the links 112,114.

Currently data switching devices (e.g., commodity data switches) support ECMP functionality, but have no direct functional support (hardware, software and/or firmware) for WCMP data traffic routing. Instead, WCMP functionality is accomplished by overloading (replicating entries in) an ECMP table to achieve WCMP traffic routing. Referring still to FIG. 1, and the example discussed above, WCMP traffic routing may accomplished for data traffic from the data switch 110 to the data switch 140 by using an EMCP table with four entries, where each of the links 112, 114 is listed once and the link 116 has a replicated listing (is listed twice), for a total of four entries. Such an approach represents a routing weight of "2" for the link 116 (by virtue of being listed twice) and a routing weight of "1" for each of the links 112, 114 (by virtue of them each being listed once).

While in the above example, WCMP may easily implemented by replicating the egress port listing for the link 116 in an EMCP table, such an approach does not work well for large scale multi-level networks, such as on networks on the order a commercial DCN. Scalability of WCMP in such networks has multiple considerations. For example, one consideration is the ability to support an arbitrary mix of weights with sufficient resolution in the switches of such networks. In large scale networks (e.g., with uneven inter-stage topologies), using ECMP tables with replicated entries to implement WCMP would typically require a prohibitive degree of replication (i.e., the required table sizes would likely far exceed the capacity of memory structures currently used to implement ECMP tables).

Another scalability concern for WCMP in large scale multi-level networks is the complexity of updating routing weights in the switches used to implement those networks. For instance, in such large scale multi-level networks (e.g., DCNs), relatively simple changes in routing weights may become large complex operations. For example, consider changing a routing weight of "5" to a routing weight of "4" in for a group with current weights 5, 30, 75, 40. Because current implementation do not take into account previous table configurations when altering routing weights, such a change would require rewriting, potentially, 149 table entries (e.g., 4+30+75+40). Accordingly, the amount of work can be arbitrarily large for even a small delta in weights.

Figure 2:
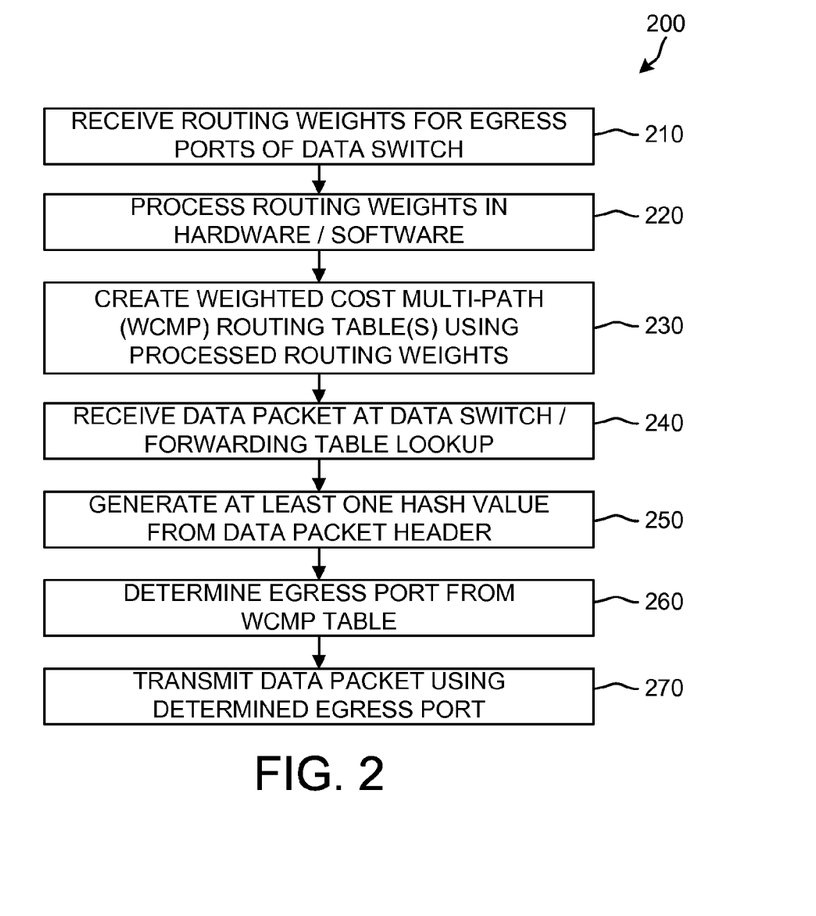
FIG. 2 is a flowchart illustrating a method for routing data traffic in a multi-level, multipath network, according to an example implementation.

FIG. 2 is a flowchart illustrating a method 200 for WCMP data traffic routing in a multi-level, multipath network, according to an example implementation. The method 200 is provided by way of illustration and may be implemented using a number of approaches, such as those described herein. In other implementations, other approaches may be used to implement WCMP data traffic routing.

The method 200, includes, at block 210, receiving a set of routing weights for a group of egress ports of a data switch. For instance, the routing weights received at block 210 may correspond with a group of egress ports that can be used to send data traffic to a particular destination. The routing weights of block 210 may be used to implement WCMP data traffic routing for data traffic sent from the data switch to that particular destination. The routing weights may be provided to the data switch using a number of approaches. For example, the routing weights may be provided to the data switch from a network configuration system. The data switch, at block 210, may receive the routing weights via a management port, via a configuration packet, or by a number of other approaches.

At block 220, the method 200 includes processing (which may also be referred to as pre-processing) the routing weights received at block 210, such as using hardware or software (or firmware) for use in a WCMP table (or WCMP tables). At block 230, the processed (pre-processed) weights of block 220 may be used (further processed) to create one or more WCMP data routing tables, where the WCMP table(s) created at block 230 may be used to route data traffic from the data switch of block 210 to the particular destination with which the received routing weights are associated. The one more WCMP tables of block 230 may be stored in the data switch using hardware, software, or a combination thereof.

At block 240, a data packet may be received at the data switch of block 210. When the data packet is received, the data switch may determine a destination address of the data packet. The destination address may then be looked up in a forwarding table to determine a corresponding routing table (or tables) to use to determine an egress port to use to send the received data packet along to its destination. If the destination address of the data packet received at block 240 corresponds with the destination address associated with the routing weights received at block 210, the forwarding table lookup may return a pointer to the WCMP table (or tables) generated at block 230.

After a determination is made, at block 240, to use the WCMP table (or tables) of block 230 to determine an egress port (hardware port or data transmission link) to use for sending the data packet along to its destination, the method 200 includes, at block 250, generating at least one hash value from a header of the received data packet. In order to ensure that all data packets in a given data flow are sent on a same path, the hash value (or values) may be generated using one or more fields of the data packet header that, for a given data flow, have fixed values. For instance a flow identification field, a source address field, a destination address field, a protocol identification field and/or a number of other possible fields with fixed values for a given data flow. The specific header field (or fields) that are used for generating the one or more hash values may depend on the particular network implementation.

At block 260, the method 200 includes determining, by using the one or more hash values as lookup value(s) for the WCMP tables of block 230. The lookup, at block 260 returns (determines) an egress port of the data switch to use to forward the data packet onto its destination. At block 270, the method 200 includes transmitting the data packet using the determined egress port. In the method 200 (as well as other methods for performing WCMP data traffic routing), a number of different hash functions may be used. For instance, a CRC16 hash function, a CRC32 hash function, an AES hash function, an SHA hash function and/or a number of other hash functions may be used. The hash function(s) used should be selected such that the hash values generated are sufficiently random for data routing purposes in a multi-level network, such as those described herein.

Further, in example implementation, a modulus (remainder) of the hash value generated by the selected hash functions may be taken before performing a lookup in the WCMP table(s). The result of the modulus function may be used directly, or indirectly, depending on the implementation, as an index (or lookup value) for the WCMP table(s) of block 230. In such an approach, a modulus function that is applied may be based on the number of entries present in a WCMP table(s) on which the lookup will be performed. For instance, if a 16 bit hash value is generated from a data packet header and an associated WCMP table that will be used to determine an egress port on which to send the data packet has nine entries, the lookup value for the WCMP table may be determined by Equation 1 below:

$$\text{Lookup value} = \text{Hash\_value} \bmod 9 \qquad \text{Equation 1}$$

Which results in a lookup value between 0 and 8, which may be used as a lookup (or to generate a lookup value or search key) for a WCMP table with indices 0 through 8 (with 9 total entries). In certain implementations, the lookup value may be a function of the result of the modulus operation (e.g., an encoded version of the result of the modulus function). The specific structure and arrangement of the WCMP table(s) (and the associated lookup values) used in the method 200 will depend on the specific implementation.

Figure 3:
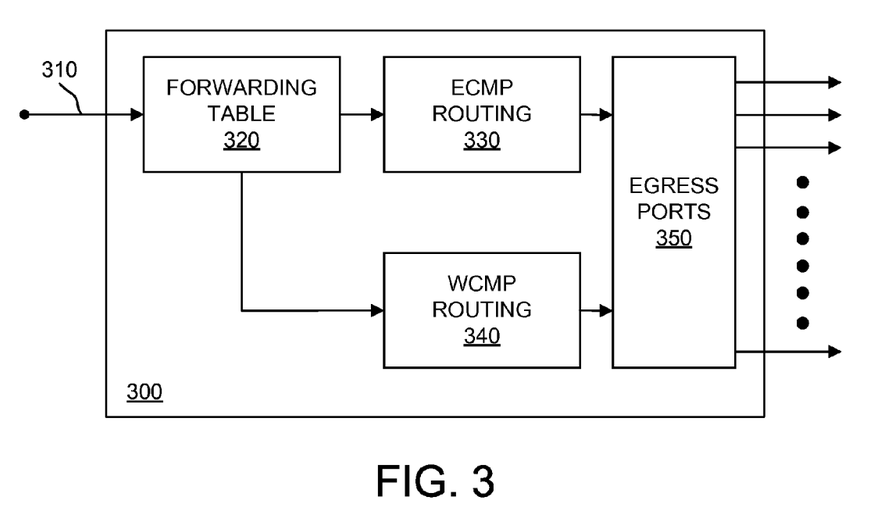
FIG. 3 is a block diagram illustrating elements of a data switch, according to an implementation.

FIG. 3 is a block diagram illustrating a data switch 300, according to an implementation. The data switch 300 of FIG. 3 includes an ingress port 310, a forwarding table 320, an ECMP routing module 330, a WCMP routing module 340 and a plurality of egress ports 350. The data switch 300 may also include other elements, such as a switch management port (management port), additional ingress ports, a (network) processor, memory structures, and so forth. The data switch 300 may be used, for example, to implement the techniques for WCMP routing described herein.

For instance, the data switch 300 may receive a set of routing weights for a particular destination, e.g., via the ingress port 310 or a management port (not shown) and use those weights to implement one or more WCMP routing tables that may be included in the WCMP routing module 340. The data switch 300 may also use the ECMP routing module 330 to implement ECMP data traffic routing for one or more destinations in a data network in which the data switch 300 is included, where each parallel path (the multipaths) between the data switch 300 and a given destination have uniform inter-level topologies.

In the data switch 300, when a data packet is received at the ingress port 310, the data switch 300 may determine a destination address for that data packet from its header. If the destination address of the received data packet corresponds with a destination address that is associated with a WCMP table (or tables) in the WCMP module 340 (e.g., corresponds with the received routing weights), the forwarding table 320 (when the destination address is used to perform a lookup in the forwarding table 320) may return a pointer to the corresponding WCMP routing tables in the WCMP routing module 340. An egress port of the egress ports 350 to use to communicate the data packet to its destination may then be determined from the corresponding WCMP table(s), such as by using the approaches described herein. After the particular egress port to use is determined, the data packet may be sent on to its destination using the determined egress port.

Figure 4:
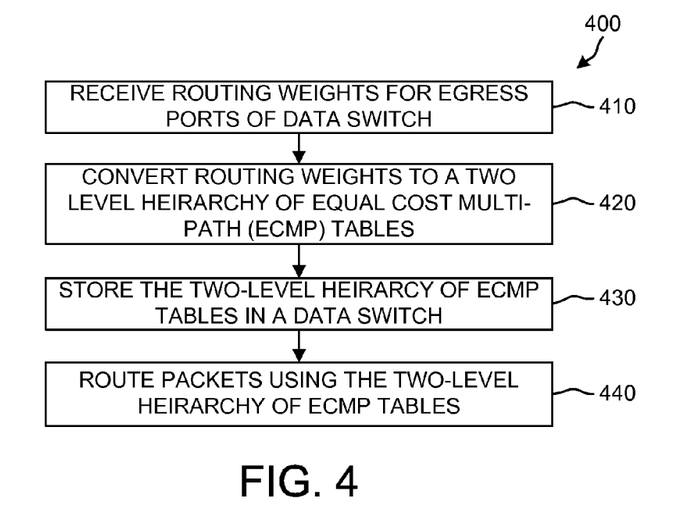
FIG. 4 is a flow chart illustrating a method for implementing weighted cost multi-path (WCMP) routing in a data switch, according to an implementation.

FIG. 4 is a flow chart illustrating a method 400 for implementing weighted cost multi-path (WCMP) routing in a data switch, according to an implementation. The method 400, along with other techniques described herein, may be used to implement approximated WCMP data traffic routing that reduces the number of routing table entries as compared to current WMCP approaches (e.g., overloading/replicating routing weights in a single ECMP table), as updates can require rewriting far fewer table entries than current approaches.

By way of illustration, the method 400 may be implemented in accordance with the example routing weights and tables of FIGS. 7-14, which will be described in further detail below. In other instances, the method 400 may be used to implement other set of routing weights for differently sized groupings of egress ports. In certain implementations (e.g., where there are sufficient available entries in the ECMP table or tables), the techniques described herein may be used to implement equivalent WCMP data traffic routing (e.g., equivalent to an overloaded ECMP table fully representing a given set of WCMP routing weights), without approximation.

As shown in FIG. 4, the method 400 includes, at block 410, receiving (e.g., at a data switch) a set of routing weights (WCMP weights) for a plurality of egress ports. As described herein, the routing weights may be a set of routing weights for traffic being sent to a particular destination device. In other implementations, the routing weights may be for routing data traffic (using WCMP) to multiple destinations, or to a particular group of destinations. Each routing weight of the set of routing weights may be associated, respectively, with a specific egress port of the data switch.

At block 420, the method 400 includes converting the set of routing weights to a two-level hierarchy of ECMP tables, where a first-level ECMP table of the two-level hierarchy is used to select one of a plurality of second-level ECMP tables. The second-level ECMP tables can each include a respective listing of egress ports of the data switch. The group of ports included in the listing of each second-level ECMP table may be the same group of ports, or may be a different group of ports. Further, each second-level ECMP table may be a weighted listing of its group of egress ports, or may be an un-weighted listing of its group of ports. The particular arrangement of the first-level ECMP table and the second-level ECMP tables will depend, at least in part, on the particular implementation and the specific WCMP routing weights that are being implemented. Examples of such tables are illustrated in, at least, FIGS. 5, 8A-8C, 10A-10C, 12A-12D and 14A-14D and are discussed further below.

At block 430, the method 400 includes storing the two-level hierarchy of ECMP tables (for WCMP traffic routing) in the data switch. In an implementation, the two-level hierarchy of ECMP tables can be stored in a memory structure of the data switch. For instance, in one implementation, the two-level hierarchy of ECMP tables may be stored in a memory structure for implementing ECMP. Alternatively, the two-level hierarchy of ECMP tables can be implemented in a dedicated structure configured to implement WCMP data traffic routing using hierarchical ECMP tables, such as using the approaches described herein.

At block 440, the method 400 includes routing data packets (e.g., with approximated WCMP or equivalent WCMP) using the two-level hierarchy of ECMP tables created at block 420 and stored in the data switch at block 430. Routing data packets using such a two-level ECMP table hierarchy is described in further detail below with respect to, at least, FIG. 6, which may include using first-level and second-level ECMP tables such as those described herein.

Figure 5:
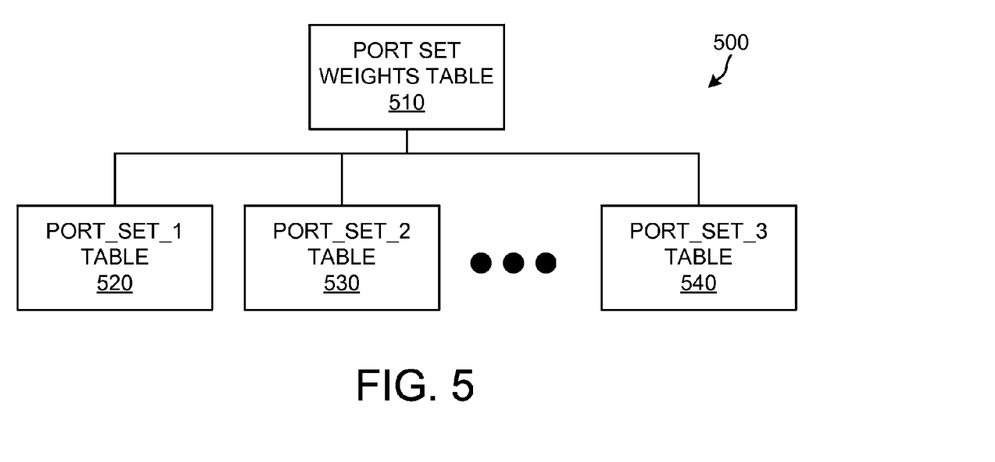
FIG. 5 is a diagram schematically illustrating a two-level equal cost multi-path (ECMP) table hierarchy for implementing WCMP, according to an implementation.

FIG. 5 is a diagram that schematically illustrates a two-level equal cost multi-path (ECMP) table hierarchy 500 for implementing WCMP routing weights, according to an implementation. The hierarchy 500 includes a port_set weights (first-level ECMP) table 510. As discussed herein, the port set weights table 510 may include a weighted listing of a plurality of second-level ECMP (port set) tables. The weights in the port set weights table may be determined based, at least, on a ratio (or ratios) of two or more of the desired routing weights for a group of egress ports for which the hierarchy 500 is used to implement WCMP data routing.

In an implementation, the port set weights table 510 can be used (e.g., with a first hash value of a data packet) to select one of a plurality of port set (second-level ECMP) tables, which, in this example, include a port set_1 table 520, a port_set_2 table 530 and a port_set_3 table 540. The selected second-level ECMP (port set) table can be then be used to select (e.g., using a second hash value of the data packet) a specific egress port on which to transmit a data packet, where this hierarchical egress port selection implements (approximated or equivalent) WCMP data traffic routing.

In the hierarchy 500, each of the listings of egress ports in the second-level ECMP (port set) tables can be a weighted or and un-weighted listing. As with weights in the port set weight table 510, weights in the port set tables 520, 530, 540 can be also be determined based, at least, on a ratio (or ratios) of two or more of the desired routing weights for a group of egress ports for which the hierarchy 500 is used to implement WCMP data routing. Further, each of the listings of ports in second-level ECMP tables can include at least one entry for each of the egress ports associated with the hierarchy 500 (e.g., include all egress ports of a given WCMP group) or, depending on the particular implementation, can include entries for a respective subset of the egress ports associated with the hierarchy 500 (e.g., a subset of egress ports of the given WCMP group). Said in other words, in such an approach, the port set weights table (first-level ECMP table) 510 is used to select a port set table (second-level ECMP table) 520, 530, 540, and the selected port set table 520, 530, 540 is used to select an egress port for transmitting a data packet. In other implementations, the hierarchy 500 can include fewer port set (second-level ECMP) tables or can include additional port set tables than shown in FIG. 5.

Figure 6:
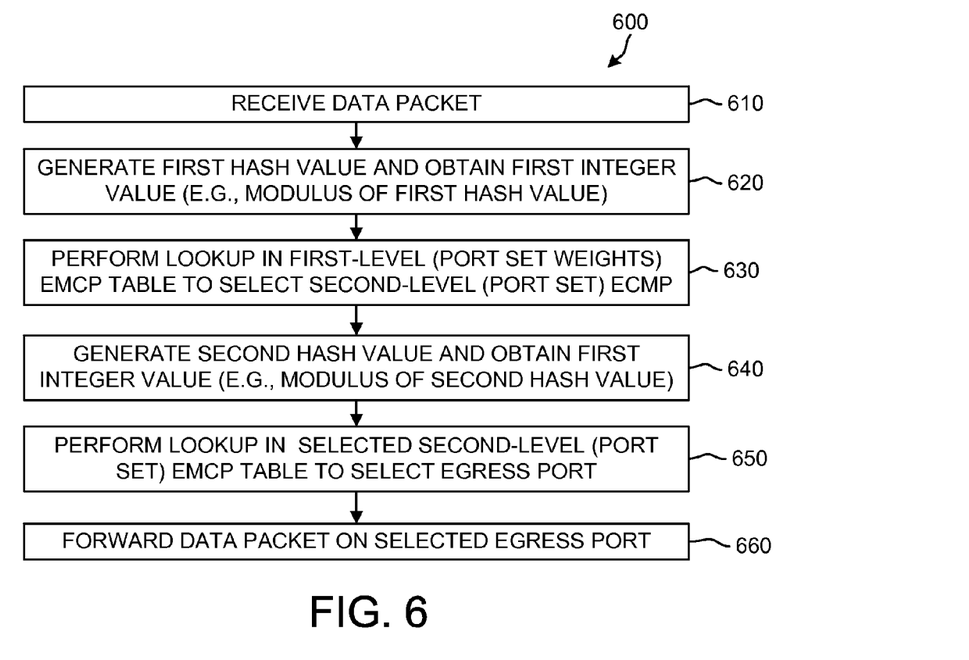
FIG. 6 is a flow chart illustrating a method for WCMP data traffic routing, according to an implementation.

FIG. 6 is a flow chart illustrating a method 600 for WCMP data traffic routing, according to an implementation. The method 600 can be implemented in conjunction with the approaches described herein. For instance, the method 600 can be implemented with a two-level hierarchy of ECMP tables, such as the hierarchy 500 of FIG. 5, so as to affect WCMP data traffic routing (e.g., approximated or equivalent).

At block 610, the method 600 includes receiving a data packet for transmission towards a destination. At block 620, the method 600 includes generating a first hash value and obtaining a first integer value from the first hash value. For example, a hash function can be used to obtain the first hash value from a header of the data packet and a modulus operation, e.g., based on a number of entries in the port set weights table, can be performed to obtain a first integer value. For instance, if the port set weights table has seven entries (weighted or un-weighted), a modulus operator of "7" can be used to obtain the integer for value. At block 630, the method 600 includes performing a lookup (using the first integer value) in a first-level ECMP table (e.g., port set weights table 510) to select a second-ECMP table (port set table) from a plurality of second-level ECMP tables (e.g., port set tables 520, 530, 540).

At block 640, the method 600 includes generating a second hash value and obtaining a second integer value from the second hash value. In an implementation, the first hash value and the second hash value may be a same hash value (and only a single hash function may be used). In other implementations, a second hash function (that is different from the hash function of block 620) can be used to obtain the second hash value from the header of the data packet (e.g., using the same fields as at block 620). Also at block 630, a second modulus operation (e.g., based on a number of entries in the selected port set table) can be performed to obtain a second integer value. At block 650, the method 600 includes performing a lookup (using the second integer value) in the selected second-level ECMP table (e.g., port set table) to select an egress port on which to transmit the data packet toward its destination. At block 660, the data packet can be forwarded towards it destination using the egress port selected at block 650.

Figure 7:
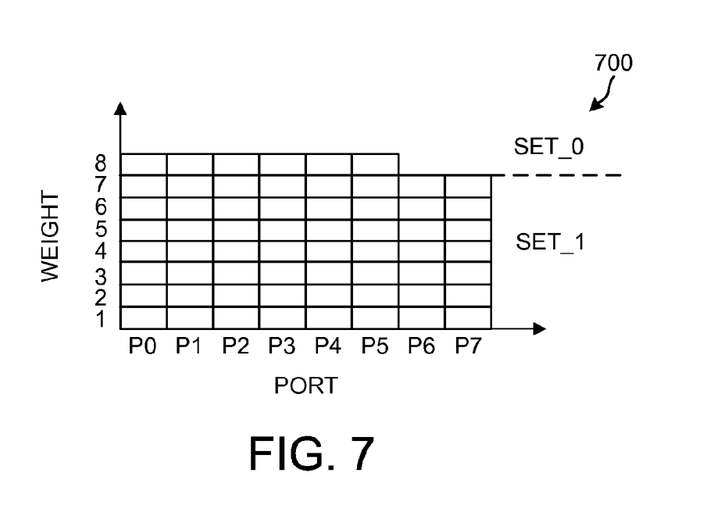
FIG. 7 is a graph illustrating a set of WCMP routing weights for a group of egress ports, according to an implementation.
Figure 8A:
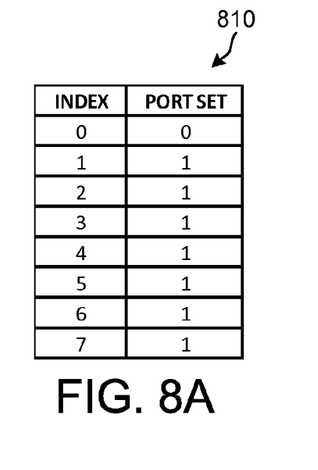
FIGS. 8A-8C are diagrams illustrating ECMP tables that may be used to implement WCMP for the routing weights of FIG. 7 using a two-level ECMP hierarchy, according to an implementation.
Figure 8B:
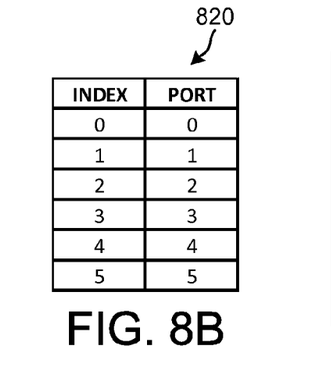
Figure 8C:
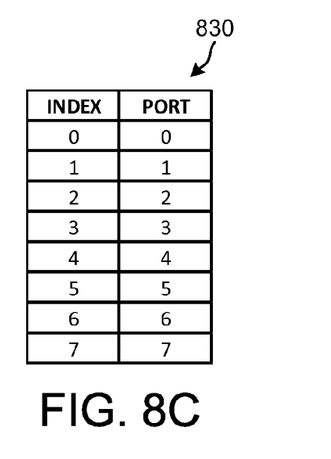

FIG. 7 is a graph 700 illustrating a set of WCMP routing weights for a group of egress ports, according to an implementation. FIGS. 8A-8C are diagrams illustrating ECMP tables 810, 820, 830 that may be used to implement WCMP data traffic routing for the routing weights of FIG. 7 using a two-level ECMP hierarchy, according to an implementation. For purposes of the following discussion, the graph 700 will be referred to as WCMP group 700.

As shown in FIG. 7, the WCMP group 700 includes eight egress ports, P0-P7. Also in the WCMP group 700, the ports P0-P5 have routing weights of "8", while the ports P6 and P7 have routing weights of "7." The ports and routing weights in the WCMP group 700 are represented by the rectangles in FIG. 7. Accordingly, the columns for P0-P5 have eight rectangles, to represent their routing weight of "8", while the columns for P6 and P7 have seven rectangles, to represent their routing weights of "7." For purposes of illustration, each of the rectangles of the WCMP groups described below will be referred to as members. Further, representation of the members (rectangles) of a given WCMP group in ECMP tables of a corresponding two-level hierarchy (such as the hierarchy 500) will be referred to as entries (which may be weighted, or un-weighted).

If the WCMP group 700 of FIG. 7 were to be implemented using a single overloaded ECMP table (by replicating entries for each egress port based on its routing weight), that overloaded ECMP table would include 62 entries (8 entries for each member corresponding with P0-P5, and 7 entries for each member corresponding with P6 and P7). In some data switching devices or network configurations, sufficient ECMP table entries may not be available to implement a 62 entry table in a given data switch. Also, because the ratio of the routing weights, in this example, cannot be reduced to integer values smaller than "7" and "8" (in order to maintain the same ratio with a reduced number of entries), significant inaccuracies in WCMP data traffic routing may result by implementing the WCMP group in an overloaded ECMP table with less than 62 entries, as incorrect ratios would be used.

Using a two-level ECMP table hierarchy, such as in accordance with the approaches described herein, the number of entries (ECMP table entries) used to implement the routing weights in the WCMP group 700 can be significantly reduced to implement a near equal approximation of the true the WCMP weights of the WCMP 700 (e.g., without introducing significant traffic waiting inaccuracies resulting from the fact that the raw ratio of the weights cannot be reduced to a ratio of smaller integer values).

As an initial example, the WCMP group 700 may be divided into multiple port sets, as indicated by the dashed line in FIG. 7. As illustrated, Set_0 in the WCMP group 700 includes the members above the dashed line, while Set_1 includes the members below the dashed line. Therefore, for the WCMP group 700, Set_0 includes six members (one for each of ports P0-P5), while Set_1 includes 56 members (seven for each of ports P0-P7). Accordingly, in an implementation, the WCMP group 700 may include a group of port sets as follows:

Ports_Sets={Set_0,Set_1} where:
Set_0={P0, P1, P2, P3, P4, P5}, and
Set_1={P0, P1, P2, P3, P4, P5, P6, P7}.

The WCMP group 700 can be implemented as a two-level hierarchy with equal traffic weighting ratios as opposed to using a single, overloaded ECMP table. In such an implementation, weights Set_0 and Set_1 could be applied (in a first-level ECMP table) as follows:

(weight_Set_0,weight_Set_1)=(6:56), which reduces to (3:28)

The ratio of (3, 28) is a reduced integer representation of the ratio of the number of members (rectangles) of Set_0 with the number of members (rectangles) of Set_1. The weights represented by the reduced ratio (3:28) of the number of members of Set_0 and Set_1 may be used in first-level ECMP table in a two-level hierarchy (such as the hierarchy 500) as port set weights, where Set_0 would have a weight of "3" and Set_1 would have a weight of "28." As shown above, there are 6 ports included in Set_0, which may be represented by an un-weighted port set table (second level ECMP table) of 6 entries. Likewise, Set_1 includes 8 ports, which may be represented by un-weighted port set table (second level ECMP table) of 8 entries.

Accordingly, a two-level hierarchy of ECMP table used to implement substantially equal ECMP weighting (as a single overloaded ECMP table) would include 45 total entries That is, in this implementation, with reference to FIG. 5, the port set weight table 510 would include 31 entries, 3 entries for Set_0 and 28 entries for Set_1. Further, the Set_0 table (Port_Set_1 table 520) would include 6 entries, one for each of P0-P5 and the Set_1 table (Port_Set_2 table 530) would include 8 entries, one for each of P0-P7. In other words, the first-level ECMP table of the two-level hierarchy would include 31 entries and the second-level ECMP tables would include 14 total entries (6 in the Set_0 table and 8 in the Set_0 table). In this example, the Port_Set_3 table 540 of the two-level hierarchy 500 would be eliminated and only two, second-level ECMP tables would be included in the two-level hierarchy 500.

In order to further reduce the total number of entries a two-level hierarchy to implement WCMP routing for the WCMP group 700 (or other WCMP groups), the ratio between the members of each set can be approximated as the ratio of rows of members in each set. While this approach may introduce some small amount of traffic weighting inaccuracy, the benefit is that WCMP data traffic routing for the routing WCMP group 700 can be implemented with even fewer entries than the 45 total entries discussed above. In large scale networks, such as DCNs (e.g., where it may be desirable for a given data switch to include WCMP routing functionality, with corresponding routing tables, for a large number of possible destinations), such reductions in routing table sizes may allow for significant cost savings, as less complex (and less expensive) data switching hardware may be used.

As an example to reduce the total number of ECMP entries used to implement a two-level ECMP table hierarchy to approximate WCMP for a set of routing weights, the sets of WCMP group 700 may be weighted, based on the number of row of members in each set, as follows:

Sets_Weights=(weight_Set_0,weight_Set_1)=(1,7)

where the port sets (Set_0 and Set_1) are the same as those listed above. Accordingly, a port set weights table of a corresponding two-level ECMP table hierarchy would have 1 entry for Set_0 and 7 entries for Set_1, for a total of 8 entries. Accordingly, a two-level hierarchy in this example would have a total of 22 entries (8 entries for the port set weights table, 6 entries for the Set_0 table and 8 entries for the Set_1 table).

FIGS. 8A-8C are diagrams that illustrate example ECMP tables 810-830, which can be used to implement the two-level hierarchy for the WCMP group 700 with a 22 total entries discussed above. For example, the table 810 may be used as a first-level ECMP table in such a two-level hierarchy. As shown in FIG. 8A, the table 810 has 8 entries, with integer indices 0-7. The integer indices may be used to match an integer value determined from a header of a data packet, such as by using a hash function and modulus operation as discussed above in order to select one of the two second-level ECMP (port set) tables 820,830. In FIG. 8A, the set weights are represented by replication in the table 810, with Set_0 being listed once (weight of "1"), and Set_1 being listed seven times (weight of "7"). In some embodiments, the ordering of the entries in the tables of such a two-level hierarchy can be randomized, as compared with the table 810. For instance, in the table 810, Set_1 could be associated with indices 0-3 and 5-7, while Set_1 could be associated with index 4.

FIG. 8B is a diagram that illustrates an un-weighted ECMP table 820 for Set_0, with indices of 0-5 and egress ports P0-P5 being listed. Likewise, FIG. 8C is a diagram that illustrates an un-weighted ECMP table 830 for Set_1, with indices of 0-7 and egress ports P0-P7 being listed. As was discussed above with respect to the table 810, the ordering of the ports in the listings of the tables 820 and 830 could be randomized, rather than listing the egress ports in the same numerical order as the indices.

Using a similar approach as the approach illustrated in FIGS. 7 and 8A-8C, the amount of routing weight inaccuracy that is introduced by such WCMP approximations when implementing the WCMP group 700 using the tables 810-830 (e.g., with 22 total table entries, as compared to 62 entries in a single overloaded ECMP table) can be monotonically reduced by altering the number of rows in each of Set_0 and Set_1 of the WCMP group 700. Because the inaccuracy is distributed evenly among each member of Set_0 (as shown in FIG. 7), including more members (rows) in Set_0 will result in the per port error being reduced.

Figure 9:
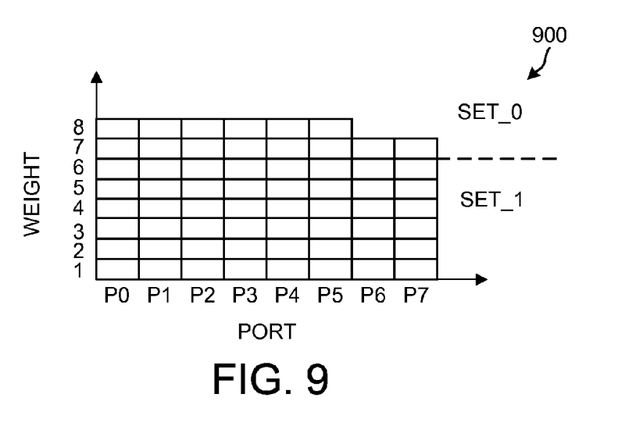
FIG. 9 is a graph illustrating another set of WCMP routing weights for a group of egress ports, according to an implementation.

FIG. 9 illustrates a WCMP group 900, which has the same member distribution as the WCMP group 700, with the difference being that Set_0 includes the top two rows of members, rather than just a single member row. In this example, Set_0 includes 14 members and can be represented using a 14 member, weighted ECMP group as follows:

Set_0={P0×2,P1×2P$\lambda$×2,P3×2,P4×2,P5×2,P6×1,P7× 1}, which can be represented in a 14 entry, weighted second-level ECMP table for Set_0 in a two-level hierarchy, such as in the table 1020. In this example, Set_1 would still be represented by an eight member, un-weighted 8 member ECMP group as follows:

Set_1={P0,P1,P2,P3,P4,P5,P6,P7}.

Figure 10A:
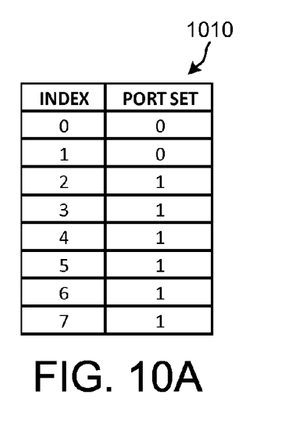
FIGS. 10A-10C are diagrams illustrating ECMP tables that may be used to implement WCMP for the routing weights of FIG. 9 using a two-level ECMP hierarchy, according to an implementation.
Figure 10B:
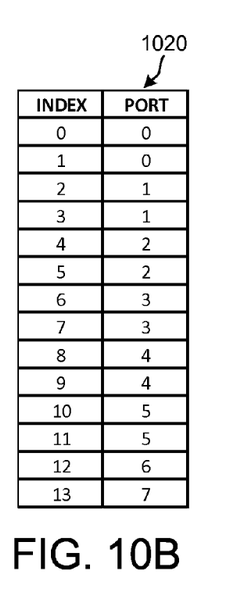

In this example, the ratio of member rows between Set_0 and Set_1 is {2:6}, which can be represented by 8 entries in weighted first-level ECMP table (port set weights table 510), such as is shown in the table 1010 in FIG. 10A. Alternatively, the ratio between the sets could be reduced to {1:3}, which could be represented in a 4 entry first-level ECMP table in a two-level hierarchy (not shown), with one entry for Set_0 and three entries for Set_1. Using the ratio of {2:6} for the set weights would result, for this example, in 30 total ECMP entries (8 in the first-level, weighted, port set weights table; 14 entries in the second-level, weighted, port set table for Set 0; and 8 entries in the second-level, un-weighted port set table for Set_0).

Figure 10C:
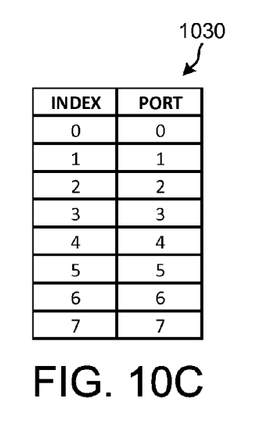

FIGS. 10A-10C are diagrams that illustrate example ECMP tables 1010-1030, which can be used to implement the two-level hierarchy for the WCMP group 900 with a 30 total entries discussed above (26 entries if the port set weights ratio is reduced to {1:3}. For example, the table 1010 may be used as a first-level ECMP table in such a two-level hierarchy. As shown in FIG. 10A, the table 1010 has 8 entries, with integer indices 0-7. As previously discussed, the integer index may be used to match an integer value determined from a header of a data packet, such as by using a hash function and modulus operation as discussed above in order to select one of the two second-level ECMP (port set) tables 1020,1030.

In FIG. 10A, the set weights are represented by replication in the table 1010, with Set_0 being listed twice (weight of "2"), and Set_1 being listed six times (weight of "6"). As previously discussed, the ordering of the entries in the table 1010 can be randomized. For instance, in the table 1010, Set_1 could be associated with indices 0-3 and 5-6, while Set_1 could be associated with indices 4 and 7.

FIG. 10B is a diagram that illustrates a weighted ECMP table 1020 for Set_0 of the ECMP group 900, with indices of 0-13 and egress ports P0-P7 being replicated according to their weights in Set_1 (P0-P5 each having a weight of "2" and P6-P7 each having a weight of "1"). As with the tables 820, 830 discussed above, the ordering of the ports in the table 1010 may be randomized.

FIG. 10C is a diagram that illustrates an un-weighted ECMP table 1030 for Set_1 of the WCMP group 900, with indices of 0-7 and egress ports P0-P7 being listed. As was discussed above with respect to the tables 820, 830 and 1010, the ordering of the ports in the listings of the table 1030 could be randomized, rather than listing the ports in the same numerical order as the indices.

The techniques discussed above may be used to further reduce the per port routing error by, for example, adding more rows to Set_0 in the ECMP group 900 (e.g., top three rows). Further, the approaches described herein may be used to implement a two-level ECMP table hierarchy that includes additional second-level ECMP tables, such as in the hierarchy 500 shown in FIG. 5. For instance, if an ECMP group includes egress ports with three weights, and the ratios of those weights cannot be reduced to smaller integer values, a two level-hierarchy (such as described herein) with three port sets (and three second-level EMCP tables) may be used to implement WCMP for that WCMP group with, depending on the number of available WCMP entries, equal data traffic weighting, or a near equal WCMP approximation. As with the foregoing examples, such a two-level hierarchy of ECMP tables (for three or more port sets) may use a reduced number of total table entries as compared to a single overloaded ECMP table.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer (or device) or on multiple computers (or devices) at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer or device. Generally, a processor will receive instructions and data from a read-only memory or a random access memory or both. Elements of a computer or device may include at least one processor for executing instructions and one or more memory devices for storing instructions and data. Generally, a computer or device also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations.

What is claimed is:

1. A method comprising:
   generating, by a data switch, a first hash value based on a header of a data packet;
   performing, by the same data switch, a lookup in a first equal cost multi-path (ECMP) table using the first hash value, the first ECMP table including a weighted listing of at least two secondary ECMP tables, the lookup in the first ECMP table selecting a secondary ECMP table of the at least two secondary ECMP tables;
   after performing the lookup in the first ECMP table, generating, by the same data switch, a second hash value based on the header of the data packet;
   performing, by the same data switch, a lookup in the selected secondary ECMP table based on the second hash value to select an egress port of a plurality of egress ports of the data switch, a first secondary ECMP table of the at least two secondary ECMP tables including a listing of a first set of egress ports of the plurality of egress ports, a second secondary ECMP table of the at least two secondary ECMP tables including a listing of a second set of egress ports of the plurality of egress ports, the listing of the first set of egress ports being different than the listing of the second set of egress ports; and
   forwarding, by the same data switch, the data packet on the selected egress port.

2. The method of claim 1, wherein:
   generating the first hash value includes generating the first hash value using a first hash function; and
   generating the second hash value includes generating the second hash value using a second hash function, the second hash function being different than the first hash function.

3. The method of claim 1, wherein the first hash value and the second hash value are a same hash value.

4. The method of claim 1, wherein:
   the first set of egress ports and the second set of egress ports is a same set of egress ports of the plurality of egress ports;
   the listing of the first set of egress ports in the first secondary ECMP table is a weighted listing; and
   the listing of the second set of egress ports in the second secondary ECMP table is an un-weighted listing.

5. The method of claim 1, wherein:
   the first set of egress ports and the second set of egress ports are different sets of egress ports, the first set of egress ports being a subset of the plurality of egress ports;
   the listing of the first set of egress ports in the first secondary ECMP table is a first un-weighted listing; and
   the listing of the second set of egress ports in the second secondary ECMP table is a second un-weighted listing.

6. The method of claim 1, wherein weights in the first ECMP table are based on a ratio of at least one routing weight of the first set of egress ports and at least one routing weight of the second set of egress ports.

7. The method of claim 1, wherein a third secondary ECMP table of the at least two secondary ECMP tables includes a listing of a third set of egress ports of the plurality of egress ports, the listing of the third set of egress ports being different than the listing of the first set of egress ports and the listing of the second set of egress ports.

8. The method of claim 7, wherein:
   the first set of egress ports, the second set of egress ports and the third set egress ports are different sets of the plurality of egress ports, the first set of egress ports being a first subset of the plurality of egress ports and the second set of egress ports being a second subset of the plurality of egress ports;
   the listing of the first set of egress ports in the first secondary ECMP table is a first un-weighted listing;
   the listing of the second set of egress ports in the second secondary ECMP table is a second un-weighted listing; and
   the listing of the third set of egress ports in the third secondary ECMP table is a third un-weighted listing.

9. The method of claim 7, wherein:
   the first set of egress ports and the second set of egress ports are different sets of egress ports, the second set of egress ports and the third set of egress ports are a same set of egress ports, the first set of egress ports are a subset of the plurality of egress ports;
   the listing of the first set of egress ports in the first secondary ECMP table is a first un-weighted listing;

the listing of the second set of egress ports in the second secondary ECMP table is a weighted listing; and
the listing of the third set of egress ports in the third secondary ECMP table is a second un-weighted listing.

10. A data switch, comprising:
at least one memory that is configured to store instructions; and
at least one processor that is operably coupled to the at least one memory and that is configured to process the instructions to cause the data switch to:
generate a first hash value based on a header of a data packet;
perform a lookup in a first equal cost multi-path (ECMP) table using the first hash value, the first ECMP table including a weighted listing of at least two secondary ECMP tables, the lookup in the first ECMP table selecting a secondary ECMP table of the at least two secondary ECMP tables;
after performing the lookup in the first ECMP table, generate a second hash value based on the header of the data packet;
perform a lookup in the selected secondary ECMP table based on the second hash value to select an egress port of a plurality of egress ports of the data switch, a first secondary ECMP table of the at least two secondary ECMP tables including a listing of a first set of egress ports of the plurality of egress ports, a second secondary ECMP table of the at least two secondary ECMP tables including a listing of a second set of egress ports of the plurality of egress ports, the listing of the first set of egress ports being different than the listing of the second set of egress ports; and
forward the data packet on the selected egress port.

11. The data switch of claim 10, wherein:
the first set of egress ports and the second set of egress ports is a same set of egress ports;
the listing of the first set of egress ports in the first secondary ECMP table is a weighted listing; and
the listing of the second set of egress ports in the second secondary ECMP table is an un-weighted listing.

12. The data switch of claim 10, wherein:
the first set of egress ports and the second set of egress ports are different sets of egress ports, the first set of egress ports being a subset of the plurality of egress ports;
the listing of the first set of egress ports in the first secondary ECMP table is a first un-weighted listing; and
the listing of the second set of egress ports in the second secondary ECMP table is a second un-weighted listing.

13. The data switch of claim 10, wherein a third secondary ECMP table of the at least two secondary ECMP tables includes a listing of a third set of egress ports of the plurality of egress ports, the listing of the third set of egress ports being different than the listing of the first set of egress ports and the listing of the second set of egress ports.

14. The data switch of claim 13, wherein:
the first set of egress ports, the second set of egress ports and the third set egress ports are different sets of egress ports, the first set of egress ports being a first subset of the plurality of egress ports and the second set of egress ports being a second subset of the plurality of egress ports;
the listing of the first set of egress ports in the first secondary ECMP table is a first un-weighted listing;
the listing of the second set of egress ports in the second secondary ECMP table is a second un-weighted listing; and
the listing of the third set of egress ports in the third secondary ECMP table is a third un-weighted listing.

15. The data switch of claim 13, wherein:
the first set of egress ports and the second set of egress ports are different sets of egress ports, the second set of egress ports and the third set of egress ports are a same set of egress ports, the first set of egress ports are a subset of the plurality of egress ports;
the listing of the first set of egress ports in the first secondary ECMP table is a first un-weighted listing;
the listing of the second set of egress ports in the second secondary ECMP table is a weighted listing; and
the listing of the third set of egress ports in the third secondary ECMP table is a second un-weighted listing.

16. A method comprising:
receiving, at a data switch, a set of routing weights for a plurality of egress ports of the data switch;
converting, at the data switch, the set of routing weights to a two-level hierarchy of equal cost multipath (ECMP) tables, the converting including:
generating a first-level ECMP table;
generating a first second-level ECMP table; and
generating a second second-level ECMP table,
the first-level ECMP table including a weighted listing of the first second-level ECMP table and the second second-level ECMP table, the first second-level ECMP table including a listing of a first set of egress ports of the plurality of egress ports of the data switch, the second second-level ECMP table including a listing of a second set of egress ports of the plurality of egress ports of the same data switch, the listing of the second set of egress ports being different than the listing of the first set of egress ports; and
storing the two-level hierarchy of ECMP tables in the data switch.

17. The method of claim 16, wherein:
the first set of egress ports and the second set of egress ports is a same set of egress ports of the plurality of egress ports;
the listing of the first set of egress ports in the first second-level ECMP table is a weighted listing; and
the listing of the second set of egress ports in the second second-level ECMP table is an un-weighted listing.

18. The method of claim 17, wherein weights in the first second-level ECMP table are based on, at least, a ratio of a first routing weight of the received routing weights and a second routing weight of the received routing weights, the first routing weight being associated with at least a first egress port of the plurality of egress ports, the second routing weight being associated with at least a second egress port of the plurality of egress ports, the second egress port being different than the first egress port.

19. The method of claim 16, wherein:
the first set of egress ports and the second set of egress ports are different sets of egress ports, the first set of egress ports being a subset of the plurality of egress ports;
the listing of the first set of egress ports in the first second-level ECMP table is a first un-weighted listing; and
the listing of the second set of egress ports in the second second-level ECMP table is a second un-weighted listing.

20. The method of claim 16, wherein weights in the first-level ECMP table are based on, at least, a ratio of a first routing weight of the received routing weights and a second routing weight of the received routing weights, the first routing weight being associated with at least a first egress port of the plurality of egress ports, the second routing weight being associated with at least a second egress port of the plurality of egress ports, the second egress port being different than the first egress port.

21. The method of claim 16, wherein the converting the set of routing weights to the two-level hierarchy of ECMP tables further includes generating a third second-level ECMP table that includes a listing of a third set of egress ports of the plurality of egress ports, the listing of the third set of egress ports being different than the listing of the first set of egress ports and the listing of the second set of egress ports.

22. A data switch, comprising:
at least one memory that is configured to store instructions; and
at least one processor that is operably coupled to the at least one memory and that is configured to process the instructions to cause the data switch to:
receive a set of routing weights for a plurality of egress ports of the data switch;
convert the set of routing weights to a two-level hierarchy of equal cost multi-path (ECMP) tables, the converting including:
generating a first-level ECMP table;
generating a first second-level ECMP table; and
generating a second second-level ECMP table,
the first-level ECMP table including a weighted listing of the first second-level ECMP table and the second second-level ECMP table, the first second-level ECMP table including a listing of a first set of egress ports of the plurality of egress ports of the data switch, the second second-level ECMP table including a listing of a second set of egress ports of the plurality of egress ports of the same data switch, the listing of the second set of egress ports being different than the listing of the first set of egress ports; and
store the two-level hierarchy of ECMP tables in the data switch.

23. The data switch of claim 22, wherein:
the first set of egress ports and the second set of egress ports is a same set of egress ports of the plurality of egress ports;
the listing of the first set of egress ports in the first second-level ECMP table is a weighted listing; and
the listing of the second set of egress ports in the second second-level ECMP table is an un-weighted listing.

24. The data switch of claim 23, wherein weights in the first second-level ECMP table are based on, at least, a ratio of a first routing weight of the received routing weights and a second routing weight of the received routing weights, the first routing weight being associated with at least a first egress port of the plurality of egress ports, the second routing weight being associated with at least a second egress port of the plurality of egress ports, the second egress port being different than the first egress port.

25. The data switch of claim 22, wherein weights in the first-level ECMP table are based on, at least, a ratio of a first routing weight of the received routing weights and a second routing weight of the received routing weights, the first routing weight being associated with at least a first egress port of the plurality of egress ports, the second routing weight being associated with at least a second egress port of the plurality of egress ports, the second egress port being different than the first egress port.

26. The data switch of claim 22, wherein the converting the set of routing weights to the two-level hierarchy of ECMP tables further includes generating a third second-level ECMP table that includes a listing of a third set of egress ports of the plurality of egress ports, the listing of the third set of egress ports being different than the listing of the first set of egress ports and the listing of the second set of egress ports.

* * * * *